US006280371B1

United States Patent
Krippelz

(10) Patent No.: US 6,280,371 B1
(45) Date of Patent: Aug. 28, 2001

(54) ELONGATED ROLLER ASSEMBLY AND METHODS OF MAKING AND REPLACING A ROLLER

(76) Inventor: Joseph Krippelz, 114 Grays Ct., Oswego, IL (US) 60538

( * ) Notice: Subject to any disclaimer, the term of this patent is extended or adjusted under 35 U.S.C. 154(b) by 0 days.

(21) Appl. No.: 09/388,964

(22) Filed: Sep. 2, 1999

(51) Int. Cl.$^7$ ..................................................... B23P 15/00
(52) U.S. Cl. ......................... 492/39; 492/40; 29/895.213
(58) Field of Search ......................... 29/895.21, 895.213, 29/895.22; 492/39, 40

(56) References Cited

U.S. PATENT DOCUMENTS

| 1,177,931 | | 4/1916 | Coleman . |
| 1,505,422 | * | 8/1924 | Potter . |
| 1,671,522 | * | 5/1928 | Furbush . |
| 2,080,027 | | 5/1937 | Allsop et al. . |
| 3,069,873 | | 12/1962 | Whitlock . |
| 4,397,072 | * | 8/1983 | Otthofer, Jr. . |
| 5,269,039 | * | 12/1993 | Isaac . |
| 5,896,662 | * | 12/1993 | Matsuzawa . |

* cited by examiner

Primary Examiner—I Cuda Rosenbaum
(74) Attorney, Agent, or Firm—Ryndak & Suri

(57) ABSTRACT

A roller that can be assembled and inserted into a device when the finished length of the roller is longer than the available replacement space comprises at least two outer tubular members inserted on an internal connector so the outer tubular members abut against each other in adjacent alignment. The outer tubular members are secured to the internal connector and to each other to prevent movement of either component The roller is constructed by inserting at least one outer tubular member on an internal connector and securing the outer tubular member to the internal connector to prevent the internal connector from moving within the outer tubular member; inserting a second outer tubular member on the same internal connector until it abuts in adjacent alignment with the last-inserted outer tubular member; and securing the tubular member to the internal connector and securing the two adjacent ends of abutting outer tubular members. The roller is replaced in a device by constructing roller segments comprising an outer tubular member mounted on an internal connector and installing the segments in the device so that the ends of adjacent outer tubular members abut and align with each other. The outer tubular members are secured to the internal connector and to each other.

17 Claims, 4 Drawing Sheets

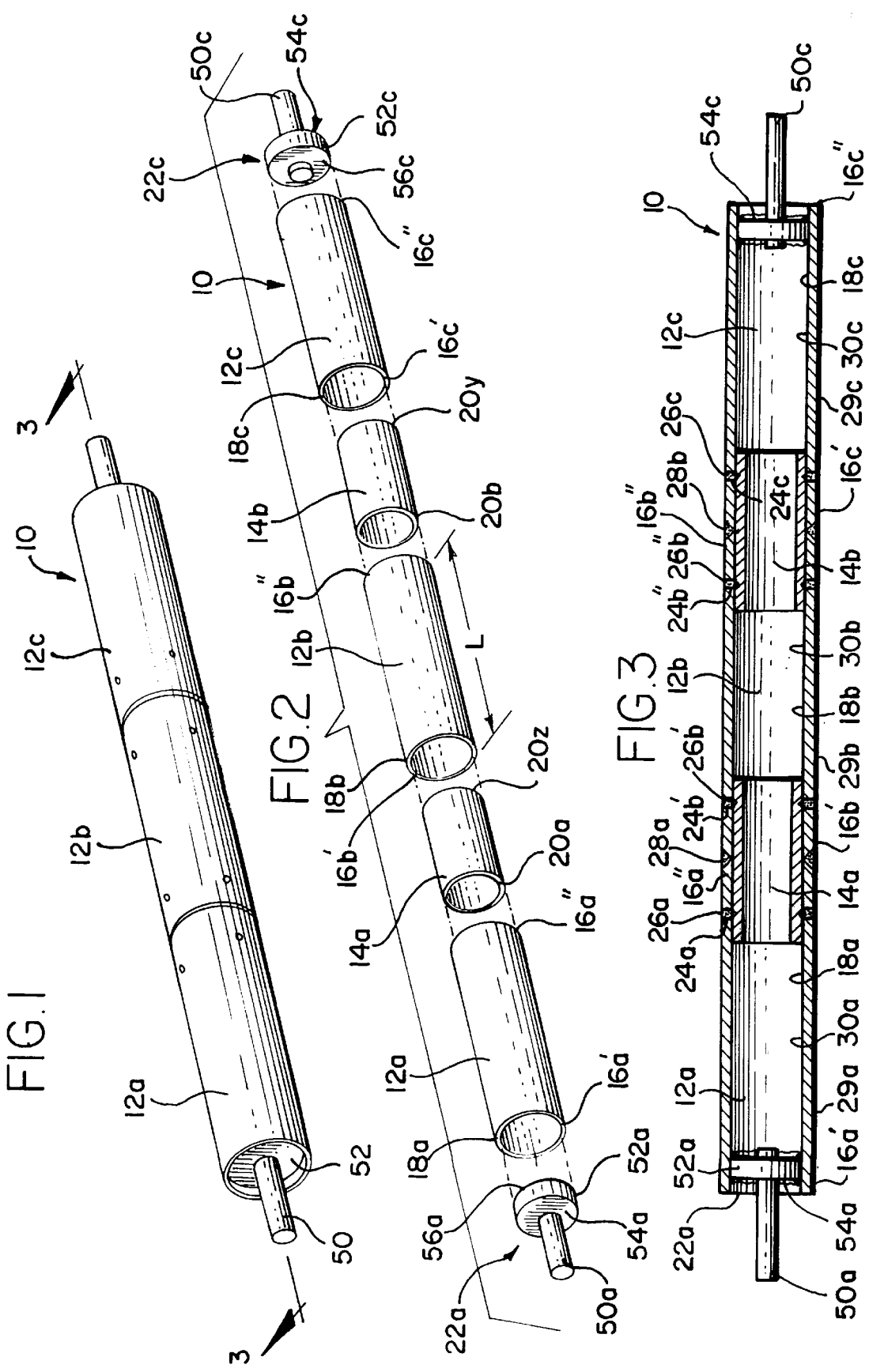

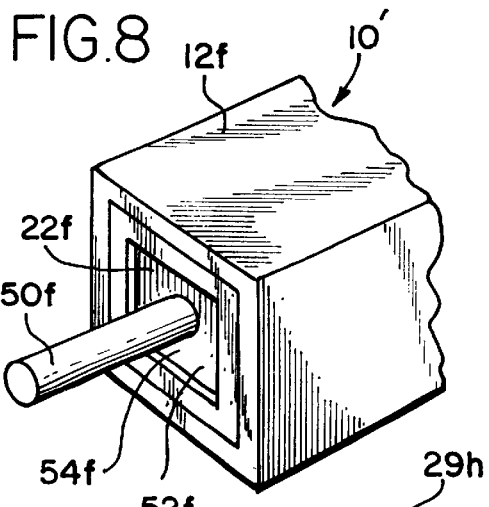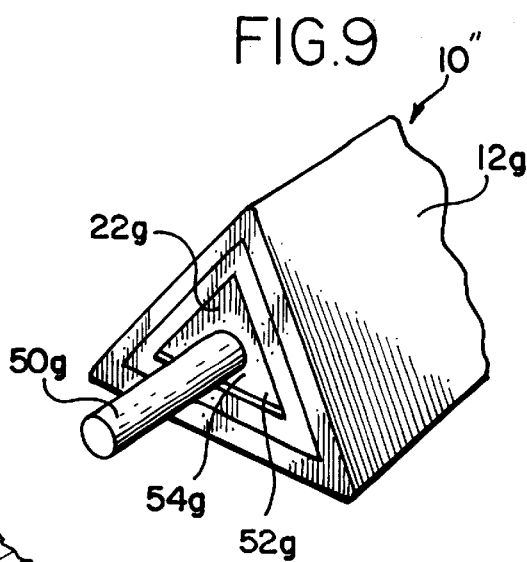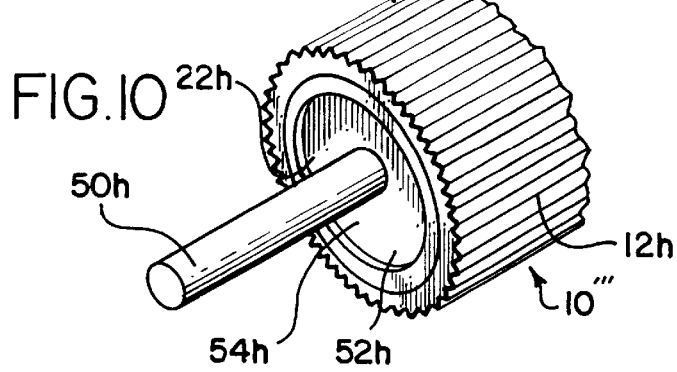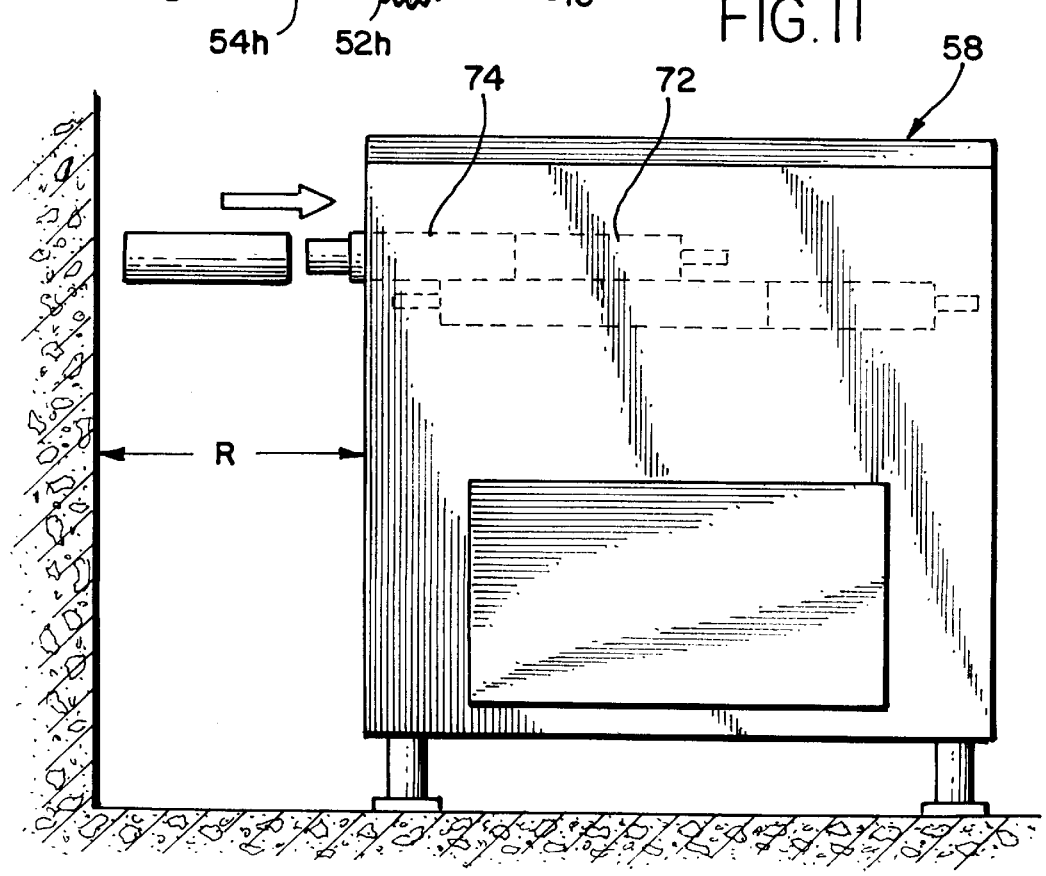

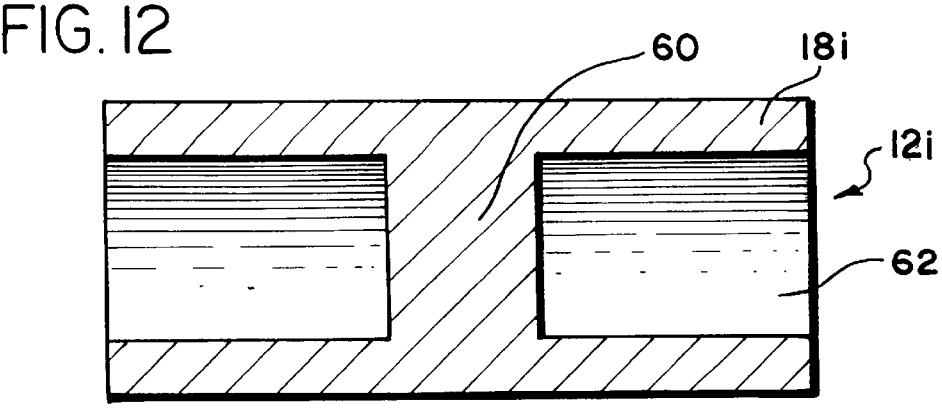
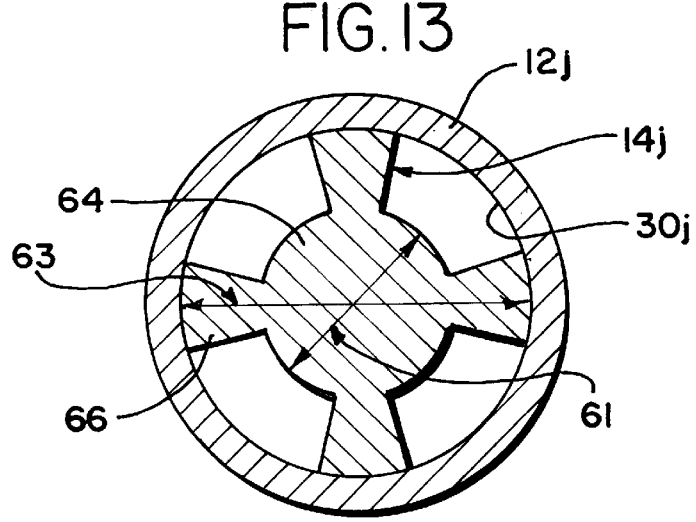
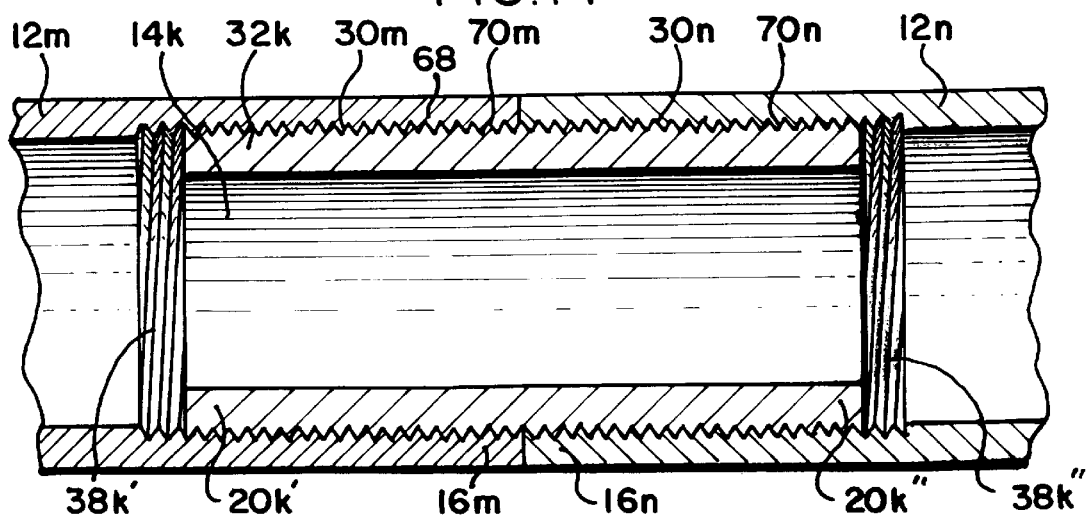

ELONGATED ROLLER ASSEMBLY AND METHODS OF MAKING AND REPLACING A ROLLER

FIELD OF THE INVENTION

This invention relates to an elongated roller and methods of making and replacing such rollers. More particularly, the present invention relates to an elongated roller composed of a plurality of outer tubular roller segments in fixed alignment and interconnected by an internal bridging member. The roller may be assembled in its entirety and inserted into a device where the required length of the roller being inserted is longer than the available replacement space. This invention also relates, in particular, to a method of making an elongated, segmented roller and a method of replacing such roller in a device where the available replacement space is too short to accommodate the replacement roller so as to prevent the roller from being inserted in the device.

BACKGROUND OF THE INVENTION

Rollers are widely used in the manufacturing process throughout a range of industries, including, e.g., foods, pharmaceuticals, cosmetics, textiles, consumer products, and machinery. As manufacturers strive to become more economical in their operation, they may position production lines closer in proximity to one another. This, however, can present a problem when a roller must be replaced in a device and the available work space for replacing the roller is less than the length of the roller being replaced so as to prevent the roller from being inserted into the device. Such a problem can be expensive to resolve and may cause manufacturers to lose valuable production time by shutting down adjacent lines in order to move equipment out of the way so that the roller can be replaced, or in the alternative, to construct plants having greater unused space between production lines so as to allow for replacement of the rollers.

Additionally, manufacturers are increasingly mindful of selecting rollers that offer good wearability and withstand the processing conditions to which such rollers are subjected.

Consequently, a need exists for a roller construction and method that provide a solution to the foregoing problems.

SUMMARY OF THE INVENTION

Accordingly, one aspect of the present invention provides an elongated roller that may be assembled to its full length and inserted into a machine as a replacement roller in situ. Thus, the invention is particularly suited for use at a site where the available replacement space is less than the minimum replacement space required to replace the old roller with a fully assembled or fully finished roller (e.g., a full-length replacement roller). As used herein, the term "available replacement space" refers to the work space that is available for positioning and inserting a roller in a device. Typically, the replacement space is the area bounded by the device that incorporates the replacement roller and by the nearest device or obstruction opposite the device into which the roller will be inserted.

In accordance with the present invention, the roller comprises at least two outer tubular roller segments in fixed alignment with opposed ends in abutting relation, interconnected by an internal bridging member. An outer cross-sectional dimension of the bridging member is slightly less than and substantially corresponds to the inner cross-sectional dimension of the outer tubular roller segment, which allows the bridging members to be readily secured in fixed relation within the roller segments. The internal bridging member can be of any desired cross-sectional shape such as a ring shape or a star shape, for example. Preferably, the outer cross-sectional shape of the bridging member corresponds to the inner cross-sectional shape of the outer tubular members bridged thereby. The internal bridging members are generally shorter in length than the individual outer tubular roller segments.

In accordance with the principles of the present invention, although not required, the roller may be configured so that the inner cross-sectional shape of the tubular roller segments corresponds to the outer cross-sectional shape of the bridging member. The outer tubular roller segments and the bridging members can have a myriad of cross-sectional shapes including a square, a rectangle, an octagon, or a rhomboid, for example. Preferably, however, the outer perimeter of the bridging member and the inner perimeter of the outer tubular segments have a circular cross-section. The internal bridging member can be solid therethrough, which embodiment has the advantage of offering a more uniform distribution of forces in the fabricated roller. Preferably, the internal bridging member comprises a cylindrical sleeve.

In another aspect of the present invention, the roller comprises at least two outer tubular roller segments in fixed alignment at the longitudinal centerline of the outer tubular segment. A cylindrical sleeve, disposed within the tubular roller segments, bridges and interconnects the tubular roller segments. Both the outer tubular roller segment and the cylindrical sleeve have a circular cross-section. The outer tubular segments are hollow but may include a section that is solid across a cross-section of the segment.

In another aspect, the present invention provides a method for producing an elongated roller assembly in accordance with the principles of the invention, which method comprises the following steps. First, a first outer tubular roller segment is inserted onto an internal bridging connector such that a portion of the internal connector extends therefrom. Second, the first outer tubular segment is plug welded through its surface to the bridging connector to prevent movement of the internal connector with respect to the outer tubular segment. Third, a second outer tubular segment is inserted on the extended portion of the internal bridging connector until the ends of the first and second tubular segments abut in adjacent alignment. Fourth, the second outer tubular segment is plug welded to the internal connector to prevent the internal connector from moving within the first outer tubular segment. Fifth, the abutting ends of the first and second outer tubular segments are secured together by fillet welding. Steps one through five are repeated as needed with additional bridging connectors and outer tubular segments, to produce a roller having the desired length.

Preferably, prior to welding the tubular segments together, a stub journal is welded to the outer tubular segments that are to become the ends of the roller.

In accordance with yet another aspect, the present invention provides a method of replacing a roller in a device where the roller being replaced is longer than the available replacement space, which effectively prevents the replacement roller from being inserted into the device. Pursuant to this aspect of the invention, first, a first roller segment, which fits within the replacement space, is formed by inserting a first outer tubular roller onto a portion of an internal connector and securing the outer tubular roller to the internal connector. Next, within the replacement space, a second roller segment is formed by inserting a second outer tubular roller member onto the extending portion of the internal connector so it abuts in adjacent alignment against the first outer tubular roller member. The second outer tubular member is then secured to the internal connector to prevent the internal connector from moving within the outer tube. The first segment is then attached to the second segment by securing the adjacent ends of the outer tubular roller segments of the first and second segments. An internal connector is inserted within the last-installed segment, and the foregoing steps are repeated with additional connectors and outer tubular segments until the desired roller length is attained. Preferably, the outer tubular roller members are secured to the internal connector via plug welding, and the outer tubular roller members are attached together via fillet welding.

The present invention also includes a method of making a roller, wherein at least one outer tube is inserted onto an internal connector so that the ends of the outer tubes abut in adjacent alignment. The outer tubes are then secured both to the internal connector to prevent movement of the internal connector and to each other. The foregoing steps are repeated until a roller having the requisite length is attained. Preferably, a flange is attached to the ends of the internal connector prior to inserting the first and second outer tubes onto the internal connector.

BRIEF DESCRIPTION OF THE DRAWINGS

Other objects and advantages of the invention will become apparent upon reading the following detailed description and upon reference to the drawings, in which:

FIG. 1 is a perspective view of an assembled roller in accordance with one embodiment of the present invention of a roller;

FIG. 2 is an exploded perspective of the roller shown in FIG. 1;

FIG. 3 is a cross-sectional view of the roller shown in FIG. 1 taken along line 3—3, showing the connection between the internal connectors and the outer tubular roller segments;

FIG. 8 is a perspective view illustrating a journalled roller in accordance with the invention and having a square cross-section;

FIG. 9 is a perspective view illustrating a journalled roller having a triangular cross-section in accordance with the present invention;

FIG. 10 is a perspective view illustrating a journalled roller having a grooved exterior surface on the outer tubular roller segments, in accordance with the present invention;

FIG. 11 is a front elevation view illustrating a method of replacing a roller, in accordance with the present invention;

FIG. 12 is a cross-sectional view of an outer tubular segment comprising a solid midcenter section;

FIG. 13 is a cross-sectional view of an internal bridging connector having a cross shape and inserted into an outer tubular segment; and FIG. 14 is a segmented, cross-sectional view of two outer tubular segments, each having a threaded internal surface, screwed onto the threaded outer surface of an internal bridging member.

DETAILED DESCRIPTION

Figure 4:
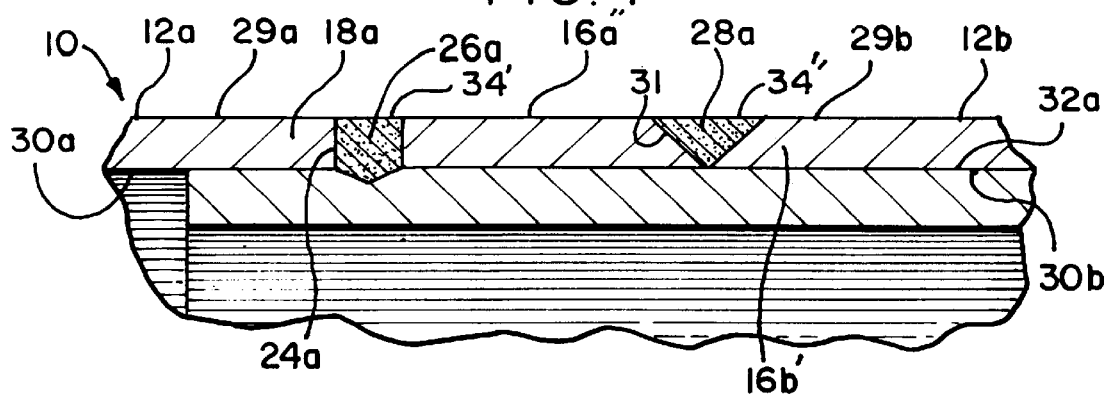
FIG. 4 is an enlarged sectional, fragmentary view of a portion of FIG. 3.

This invention includes all alternatives, modifications, and equivalents that may be encompassed within the spirit and scope of the invention, as defined by the appended claims. Where a preferred embodiment is described below, the invention is not limited to that embodiment. Throughout the following, like numerals refer to like parts or steps.

FIGS. 1–4 illustrate a roller 10 in accordance with the present invention. Shown in greater detail in FIGS. 2 and 3, roller 10 is an elongated roller comprising at least two outer tubular roller segments 12a, 12b, 12c and internal bridging members 14a, 14b. Outer tubular roller segments 12a, 12b, 12c each have a length L, a tubular wall 18, and inner and outer cross-sectional dimension. In practicing the method of the invention, as hereafter described, L is shorter than the available replacement space. Internal bridging members 14a,14b each have two opposite ends 20a, 20z and 20b, 20y and an inner and outer cross-sectional dimension. Preferably, internal bridging members 14a, 14b comprise an internal sleeve, although in another embodiment, internal bridging members 14a, 14b can be solid therethrough. Internal bridging member 14a is inserted within outer tubular roller segments 12a, 12b, and internal bridging member 14b is inserted within outer tubular roller segments 12b, 12c, as the outer cross-sectional dimension of internal bridging members 14a, 14b is slightly less than and substantially corresponds to the inner cross-sectional dimension of outer tubular roller segments 12a, 12b, 12c. Preferably, the outer diameter of internal bridging members 14a, 14b is about 0.002 inches less than the inner diameter of outer tubular roller segments 12a, 12b, 12c. Disposed within outer tubular roller segments 12a, 12b, internal bridging member 14a interconnects those outer tubular roller segments and holds them in fixed alignment with respect to each other so that adjacent ends of outer tubular roller segments 12a, 12b abut against each other. Similarly, internal bridging member 14b interconnects outer tubular segments 12b, 12c and holds them in fixed alignment. When in fixed alignment, the longitudinal centerlines of each tubular roller segment 12a, 12b, 12c are in correspondence. Bridging member 14a is secured, preferably by welding, to outer tubular roller segments 12a, 12b to prevent bridging member 14a from moving within outer tubular roller segments 12a, 12b. Bridging member 14a is preferably shorter in length than tubular roller segments 12a, 12b; however, bridging member 14a can be longer for added strength.

FIG. 2 is an exploded view illustrating the construction of roller 10. Further illustrated in FIG. 2 is a preferred embodiment of the present invention which includes journals 22a, 22c secured to the first- and last-inserted outer tubular roller segments 12a, 12c positioned at the ends of roller 10. Journals 22a, 22c each comprise a stub 50a, 50c and a journal support 52a, 52c. Journal supports 52a, 52c attach journals 22a, 22c to an end 16a', 16c'' of the outer tubular roller segments 12a, 12c and thereby enclose the end.

FIG. 3 shows a cross-sectional view of roller 10, taken along line 3—3 of FIG. 1. FIG. 3 shows roller 10 in an assembled state, having first internal bridging member 14a inserted partway into first and second outer tubular roller segments 12a, 12b, respectively, and second bridging member 14b inserted into second and third outer tubular roller segments 12b, 12c. Preferably, outer tubular roller segments 12a, 12b, 12c each have a plurality of apertures 24a, 24b', 24b", 24c circumferentially spaced apart in tubular walls 18a, 18b, 18c near at least one end 16a", 16b', 16b", 16c', which apertures 24a, 24b', 24b", 24c are disposed through tubular wall 18a, 18b, 18c, perpendicular to the wall surface. Preferably, for a roller of about five inches in diameter, apertures 24a, 24b', 24b", 24c have a diameter of about one-half inch. Ends 16a", 16b' of adjacent outer tubular roller segments 12a, 12b abut against each other to provide strength to roller 10. A similar abutting relationship exists between ends 16b", 16c' of adjacent outer tubular segments 12b, 12c. In a preferred embodiment, to prevent internal bridging member 14a from moving within outer tubular roller segments 12a, 12b, plug welds 26a, 26b' are made through the surface of tubular wall 18a, 18b at the plurality of apertures 24a, 24b'. Plug welds 26b", 26c are also made through the plurality of apertures 24b", 24c near abutting ends of outer tubular roller segments 12b, 12c to prevent internal bridging member 14b from moving therein. Preferably, as shown in FIG. 3, adjacent opposed ends 16a", 16b' and 16b", 16c' of outer tubular roller segments 12a, 12b and 12b, 12c are held in abutting relation by fillet welds 28a and 28b, respectively. Fillet welds 28a, 28b are disposed circumferentially around ends 16a", 16b' and 16b", 16c' of adjacent tubular roller segments 12a, 12b and 12b, 12c.

In an alternative embodiment, internal bridging member 14k is screwed into outer tubular members 12m, 12n for additional securement. In this embodiment, shown in FIG. 14, internal bridging member 14k comprises threads 68 disposed circumferentially on outer surface 32k, and outer tubular segments 12m, 12n comprise corresponding threads 70m, 70n disposed circumferentially on inner surface 30m, 30n. Alternatively, threads 68 can be positioned at a selected distance from ends 20k', 20k" of internal bridging member 14k, and threads 70 m, 70n can be positioned at a selected distance from ends 16m, 16n of outer tubular segments 12m, 12n. Preferably, internal bridging connector 14k has flanges 38k', 38k" secured to each opposite end 20k', 20k". Preferably, for additional securement, internal bridging member 14k is also welded to outer tubular members 12m, 12n, as previously discussed.

FIG. 4 is an enlarged sectional, fragmentary view illustrating the attachment of two outer tubular segments 12a, 12b by welding to each other and to internal bridging member 14a. FIG. 4 shows on the left, plug weld 26a going through tubular wall 18a of outer tubular roller segment 12a. Plug weld 26a is made at aperture 24a in outer tubular segment 12a and preferably extends perpendicularly through the surface of outer tubular roller segment 12a to attach outer tubular roller segment 12a to internal bridging member 14a. Plug weld 26a preferably engages internal bridging member 14a in a conical point of contact. FIG. 4 shows to the right of plug weld 26a, circumferential fillet weld 28a interconnecting ends 16a", 16b' of two adjacent outer tubular roller segments 12a, 12b. Outer tubular segments 12a, 12b each have an outer surface 29a, 29b and inner surface 30a, 30b. FIG. 4 shows a preferred embodiment wherein ends 16a", 16b' of outer tubular roller segments 12a, 12b each have an angled edge wherein outer surfaces 29a, 29b are about 45° with respect to inner surfaces 30a, 30b. When two outer tubular roller segments 12a, 12b abut one another, the angles at ends 16a", 16b' form a circumferential groove 31 that encircles the outer perimeter of outer tubular segments 12a, 12b. Fillet weld 28a, made at circumferential groove 31, has an inverted conical shape where the base of the cone is flush with outer surfaces 29a, 29b of outer tubular roller segments 12a, 12b and the point of the cone is directed toward inner surfaces 30a, 36b. Fillet weld 28a has a width of about one-half to five-eighths inch and, most preferably, one-half inch. Preferably, fillet weld 28a penetrates outer surfaces 32a of internal bridging member 14a for additional reinforcement of internal bridging member 14a within outer tubular roller segments 12a, 12b. Preferably, outer surfaces 34', 34" of plug weld 26a and fillet weld 28a, respectively, are flush with outer surfaces 29a, 29b of outer tubular roller segments 12a, 12b so as to ensure a smooth, uniform roller surface. Preferably, outer surfaces 34' and 34" of plug weld 26a and fillet weld 28a, respectively, have a texture matching that of outer surfaces 29a and 29b of outer tubular roller segments 12a and 12b.

In another embodiment, each outer tubular roller segment 12p is secured to a corresponding internal bridging member 14e by a joining material that fills each aperture.

Figure 5:
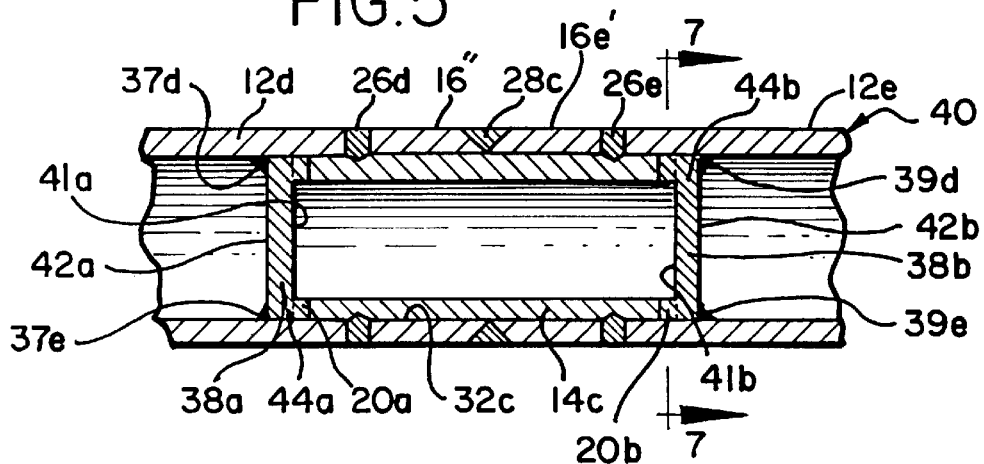
FIG. 5 is a sectional fragmentary view of a portion of an alternate embodiment of a roller in accordance with the invention, showing an internal connector having two enclosed ends, welded to two outer tubular roller segments.

FIG. 5 is a sectional, fragmentary view of another embodiment of a roller 40 in accordance with the invention. Outer tubular roller segments 12d; 12e are inserted on and attached to internal bridging member 14c. A fillet weld 28c adjoins adjacent ends 16d", 16e' of outer tubular roller segments 12d, 12e; and at least one plug weld 26d, 26e (in this case) attaches outer tubular roller segments 12d, 12e to outer surface 32a of an internal bridging member 14c. Internal bridging member 14c shown in FIG. 5 has flanges 38a, 38b secured to each opposite end 20a, 20b. Each flange 38a, 38b comprises an inner surface 41a, 41b, an outer surface 42a, 42b, and a circumferential edge 44a, 44b. Flanges 38a, 38b are mutually secured at a desired location within outer tubular segments 12d, 12e, respectively, such as by welds 37d, 37e and 39d, 39e, which may extend around circumferential edge 44a, 44b of flanges 38a and 38b,for example. Flanges 38a and 38b provide a stop when internal bridging member 14c is inserted within segments 12d and 12e. Preferably, flanges 38a and 38b are located such that about one-half the length of bridging member 14c is inserted into each of segments 12d and 12e. Each flange 38a, 38b has a diameter that substantially corresponds to the outer diameter of internal bridging member 14c so that circumferential edges 44a, 44b align with outer surface 32c of internal bridging member 14c. Each secured flange 38a, 38b imparts additional strength to finished roller 40, particularly at a defined distance away from fillet weld 28c. This arrangement makes roller 40 suitable for a wider range of applications, including those requiring a uniform distribution of forces in the fabricated roller.

Figure 6:
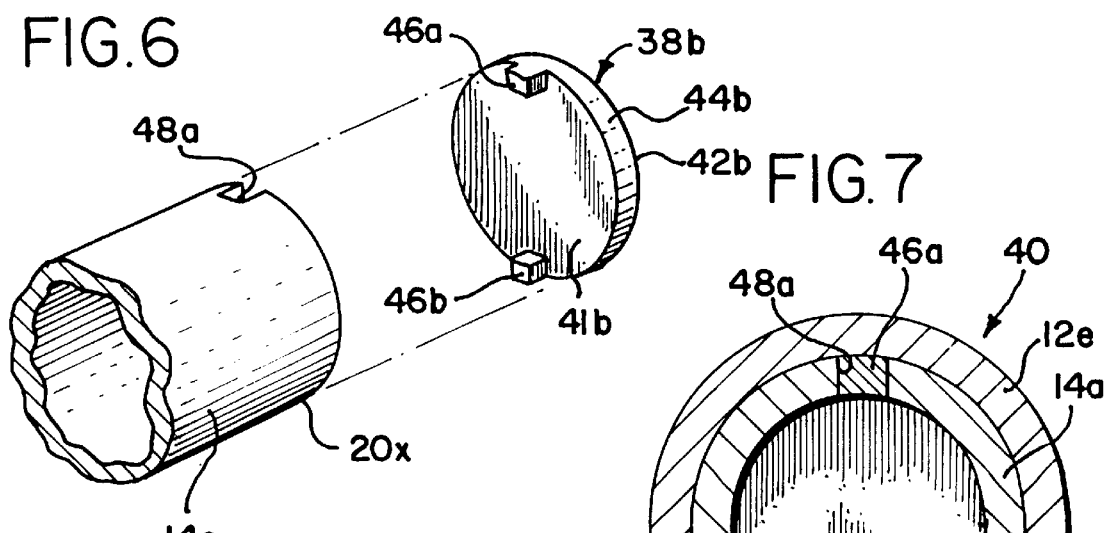
FIG. 6 is a perspective view illustrating an internal connector of the embodiment of FIG. 5, as it aligns with an end piece.

FIG. 6 is a perspective view showing additional detail of flange 38b and internal bridging member 14c. In the embodiment illustrated, flange 38b has two tabs 46a, 46b extending distally from circumferential edge 44b in a direction opposite that of outer surface 42b of flange 38b. Tabs 46a, 46b are positioned approximately 180° from each other on flange 38b. Each tab 46a, 46b fits into a notch 48a (48b not shown) located in axial alignment therewith at end 20x of internal bridging member 14c. Other suitable means of attachment depending on the intended use of roller 40—e.g., welding, adhesives, screws, for example—may be employed to secure flange 38b to end 20x of internal bridging member 14c. Flange 38b must be attached to internal bridging member 14c prior to inserting internal bridging member 14c into outer tubular roller segments 12d and 12e. Alternatively, the angular placement of tabs 46a, 46b may vary. In another embodiment, flange 38c (not shown) may have more than two tabs, distributed thereon.

In another embodiment (not shown), flange 38c has a diameter that is slightly less than and substantially corresponds to the inner cross-sectional diameter of internal bridging member 14f so that flange 38c fits within end 20w of internal bridging member 14f.

Figure 7:
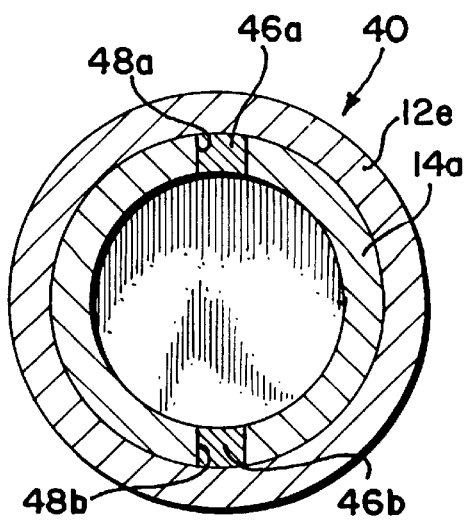
FIG. 7 is a cross-sectional view of the roller shown in FIG. 5 taken along line 7—7.

FIG. 7 is a cross-sectional view of roller 40, taken along line 7—7 of FIG. 5. FIG. 7 shows outer tubular roller segment 12e inserted onto internal bridging member 14c. Flange 38b has opposing tabs 46a and 46b secured into notches 48a and 48b,respectively, in internal bridging member 14c.

FIGS. 8, 9, and 10 collectively show journals 22f, 22g, 22h secured within the inner cross-sectional dimension of outer tubular roller segments 12f, 12g, 12h in rollers 10', 10", 10'". Journal supports 52f, 52g, 52h each have an outer face 54f, 54g, 54h and an inner face 56f, 56g, 56h (not shown) and are secured within outer tubular roller segments 12f, 12g, 12h by welding around the perimeter of outer faces 54f, 54g, 54h. In a preferred embodiment, journal supports 52f, 52g, 52h are secured within outer tubular roller segments 12f, 12g, 12h by welding around the perimeter on both outer faces 54f, 54g, 54h and inner faces 56f, 56g, 56h. This form of attachment provides additional strength to rollers 10', 10", 10'". When roller 10', 10" or 10'" is mounted in device 58 in which it will function, journal stubs 50f, 50g, 50h provide attachment and rotation of rollers 10', 10", 10'" within device 58.

As shown in FIG. 10, outer tubular roller segment 12h of roller 10'", constructed in accordance with the present invention, has a circular cross-sectional shape. In alternative embodiments, also in accordance with the present invention, outer tubular roller segments 12f, 12g may have a variety of cross-sectional shapes including, for example, a square or a triangle as illustrated in FIGS. 8 and 9, respectively.

Shown in FIG. 12 is a cross-sectional view of outer tubular segment 12i, in accordance with the present invention and taken along the longitudinal axis, comprising a solid midcenter section 60. Solid midcenter 60, together with tubular wall 18i defines a void 62 for receiving internal bridging connector 14d.

In an alternative embodiment, internal bridging connector 14j need not have uninterrupted circumferential conformance with inner surface 30j of outer tubular segment 12j, and its outer cross-sectional shape need not be identical to that of the inner cross-section of outer tubular segment 12j. As shown in FIG. 13, internal bridging connector 14j can have, for example, a cross shape that fits within outer tubular segment 12j. In this example of the embodiment, the cross shape comprises a center component 64 and a plurality of extensions 66. The outer surface of extensions 66 substantially correspond in shape to inner surface 30j of outer tubular 30 segment 12j. Center component 64 has a cross-sectional dimension 61, and internal bridging connector 14j has a cross-sectional dimension 63 which substantially corresponds with the inner cross-sectional dimension of outer tubular segment 12j. Internal bridging connector 14j may have a variety of cross-sectional shapes including a triangle, a square, or an octagon, as examples.

Outer surface 29a, 29b, 29c of outer tubular roller segment 12a, 12b, 12c may have a variety of textures. Surface 29a, 29b, 29c is preferably smooth, as shown in FIGS. 1–3. In another embodiment, surface 29h is grooved, as shown in FIG. 10. In an alternative embodiment, surface 29 may have a textured design thereon (not shown).

As an example of a preferred embodiment of roller 10, outer tubular members 12a, 12b, 12c and internal connectors 14a, 14b all have a wall thickness of approximately one-quarter inch, outer tubular members 12a, 12b, 12c are about 60 inches long, and internal connectors 14a, 14b are about 12 inches long. The outer diameter of internal connectors 14a, 14b substantially corresponds to and is about 0.002 inches less than the internal diameter of outer tubular members 12a, 12b, 12c.

In accordance with the present invention, the method of constructing roller 10 of FIGS. 1–2 is now described in detail. The method involves partially inserting first outer tubular roller segment 12a onto internal bridging connector 14a so that a portion of internal bridging connector 14a remains exposed. First outer tubular segment 12a is then secured to internal connector 14a by plug-welding outer tubular roller segment 12a through apertures 24a to internal connector 14a. The resulting plug weld 26a extends through outer surface 29a of first outer tubular segment 12a so as to prevent internal connector 14a from moving within outer tubular segment 12a. Second outer tubular segment 12b is inserted onto the exposed portion of internal connector 14a until ends 16a", 16b' of first and second outer tubular segments 12a, 12b abut in adjacent alignment. Second outer tubular segment 12b is then plug-welded at apertures 24b' to internal connector 14a so as to prevent internal connector 14a from moving within second outer tubular segment 12b. Ends 16a", 16b' of first and second outer tubular segments 12a, 12b, respectively, held in abutting alignment, are then fillet-welded to form fillet weld 28a. Plug weld 26a is made prior to fillet weld 28a in order to relieve stress on fillet weld 28a. The foregoing steps are repeated until a roller 10 of the desired length is attained. Preferably, outer surfaces 34', 34" of plug weld 26a and fillet weld 28a, respectively, are ground to achieve a smooth, uniform roller surface.

In an alternative embodiment, journals 22a, 22c comprising stubs 50a, 50c and journal supports 52a, 52c are inserted into ends 16a', 16c" of outer tubular segments 12a, 12c that will subsequently become the first and last ends of roller 10 to be inserted in device 58. Journals 22a, 22c are secured to outer tubular roller segments 12a, 12c by welding journal supports 52a, 52c around the perimeter of their outer face 54a, 54c to outer tubular roller segments 12a, 12c. Such welding is done prior to welding tubular roller segment 12a to tubular segment 12b and prior to welding tubular roller segment 12b to tubular segment 12c. Preferably, prior to welding outer faces 54a, 54c to outer tubular roller segment journals 12a, 12c, respectively, inner faces 56a, 56c of journals 22a, 22c are welded to tubular roller segments 12a, 12c, respectively, so as to produce a roller having even greater strength. Such welding is done prior to welding outer tubular roller segment 12a to tubular roller segment 12b.

The invention also provides a method of replacing a roller in a device where the length of the roller being inserted into device 58 is greater than the replacement space (R) so to preclude insertion of the pre-assembled roller into device 58, as shown in the schematic of FIG. 11.

A first roller segment 72 is assembled by inserting outer tubular member 12a onto internal connector 14a so that a portion of internal connector 14a extends from outer tubular member 12a. Preferably, flanges 38a, 38b are attached to opposing ends 20a, 20z of internal connector 14a prior to inserting outer tubular member 12a onto internal connector 14a so as to impart additional strength to roller 10 at a point between ends 16a", 16b' of outer tubular members 12a, 12b on roller 10. It is also preferable that journals 22a and 22c, comprising stubs 50a and 50c secured to supports 52a, 52c, be attached to ends 16a' and 16c" of outer tubular members 12a and 12c, respectively, that will become the first-inserted and last-inserted ends of roller 10. Most preferably, journal support 52a is welded to outer tubular member 12a at selected areas around the perimeter of outer face 54a of journal support 52a. For additional strength, journal support 52a is welded at selected areas around both its outer face 54a and inner face 56a to end 16a' of outer tubular member 12a.

Outer tubular member 12a is then secured to internal connector 14a to prevent internal connector 14a from moving within outer tubular member 12a. Preferably, outer tubular member 12a is plug-welded to internal connector 14a through apertures 24a circumferentially spaced near end 16a" of outer tubular member 12a. At least a portion of first roller segment 72 is installed in device 58.

A second roller segment 74 is assembled by inserting second tubular member 12b onto the portion of internal connector 14a that extends from installed first roller segment 72. Second tubular member 12b, comprising second segment 74, is inserted until it abuts in adjacent alignment against first tubular member 12a of installed first roller segment 72, this stage of assembly being shown by the top roller in FIG. 11. Second tubular member 12b is secured to internal connector 14a to prevent internal connector 14a from moving within second tubular member 12b. Preferably, second tubular member 12b is attached to internal connector 14a by plug welding, as previously described. Outer tubular member 12b of second roller segment 74 is attached to outer tubular member 12a of first segment 72. Preferably, two outer tubular members 12a, 12b are attached to each other by fillet welding as described above. The steps outlined above are repeated until a roller having the required length is attained. Most preferably, plug weld 26a and fillet weld 28a are ground smooth to achieve a uniform roller surface. Journal 22c is similarly secured to the last-inserted outer tubular member 12c, as described above.

The top roller shown in FIG. 11 illustrates the method of replacing a roller in device 58 in situ. The bottom roller in FIG. 11 is the fully assembled roller inserted into position, ready for operation.

One important advantage of the present invention is that it addresses the problem of replacing an entire roller in a device when the work space available for making the replacement is smaller than the length of the pre-made replacement roller. In the present invention, the dimensions and the cross-sectional shape and size of the replacement components can be varied to ensure that a roller can be replaced within the most confined work space.

Another advantage of the present invention is its strength, which can be increased by, among other things, altering the length of the internal connector with respect to the outer tubular members; by welding the outer tubular members to the internal connector and to adjacent, abutting tubular members; by incorporating a larger number of apertures in the outer tubular members; and by decreasing the tolerance between the outer tubular member and internal connector to 0.002 inches. Increased strength can also be achieved by using an outer tubular member, an internal portion of which is solid or buttressed by an axial member connected to the inner surface by axial extensions.

Although the present invention has been described with respect to specific embodiments thereof, it will be understood that various changes and modifications will be suggested to one skilled in the art, and it is intended that the invention encompass such changes and modifications as fall within the scope of the appended claims.

I claim:

1. A method of making a rigid roller, comprising the steps of:
    (a) inserting a first rigid outer tubular roller segment onto a rigid internal bridging connector, leaving a portion of said internal connector extending therefrom, said internal bridging connector being substantially shorter in length than the finished length of the roller;
    (b) plug welding through the surface of said first outer tubular segment to interconnect said internal bridging connector to said first outer tubular segment to prevent movement of said internal bridging connector relative to said first outer tubular segment;
    (c) inserting a second outer tubular segment onto said extended portion of said internal connector until the ends of said outer first and second tubular segments abut in adjacent alignment;
    (d) plug welding said second outer tubular segment to said internal connector to prevent movement of said internal connector within said second outer tubular segment;
    (e) fillet welding the abutting ends of said first and second outer tubular segments; and
    (f) after step (e), repeating steps (a) through (e) as needed to produce a roller of sufficient length, each repeating of steps (a)–(e) being performed with an additional rigid internal bridging member and an additional rigid tubular roller segment, wherein prior to commencing said repeating of steps (a)–(e), first inserting said additional rigid internal bridging connector onto one of said previously installed rigid tubular roller segments.

2. The method of claim 1 further comprising the step of:
    welding a stub journal having an inner face and an outer face to each said end of said outer tubular segments that will subsequently become an end tubular segment of said roller, wherein said welding attaches at least one portion of the perimeter of one of said faces of said stub journal to said outer tubular segment and is done prior to welding said end tubular segment to another tubular segment.

3. The method of claim 1 further comprising:
    welding a stub journal having an inner face, an outer face and a portion located within said outer tubular segment that will subsequently become said end tubular segment of said roller, said welding attaching both faces of said stub journal to said end outer tubular segment and being done prior to welding said end tubular segment to another tubular segment.

4. The method of claim 1 further comprising:
    grinding said plug welding and said fillet welding to achieve a uniform roller surface.

5. A method of replacing a roller in a device wherein the length of the roller to be replaced is greater than the available replacement space so that a fully assembled replacement roller cannot be inserted into the device comprising:
    (a) making a first roller segment that is shorter than the replacement space by inserting an outer tubular roller member onto a first internal connector, leaving a portion of said first internal connector extending therefrom, and securing said outer tubular roller member to said first internal connector to prevent movement of said first internal connector within said outer tubular roller member;
    b) inserting at least a portion of said first segment within said confined space;
    (c) assembling a second roller segment by inserting a second outer tubular roller member onto said extended portion of said first internal connector so it abuts in adjacent alignment against said first outer tubular roller member of said installed first segment, and attaching said second outer tubular roller member to said first internal connector to prevent movement of said second outer tubular roller member on said first internal connector so as to form said second segment;

(d) attaching said outer tubular roller member of said second segment to said outer tubular roller member of said first segment; and (e) repeating steps (a) through (d), as needed, wherein after step (d) an internal connector is inserted onto said last-installed segment.

6. The method of claim 5, wherein:

(a) said attaching of said outer tubular roller members to said internal connectors is done by plug welding; and (b) said attaching of said outer tubular roller member of said first segment to said outer tubular roller member of said second segment is done by fillet welding.

7. The method of claim 5 further comprising the additional step of:

attaching a flange to the opposite ends of said internal connector prior to inserting said outer tubular members onto said internal connector.

8. The method of claim 5 further comprising:

prior to installing said first segment, attaching a journal at the end of said first segment that will become said end of said roller; and attaching a journal at the end of said last segment to be installed.

9. The method of claim 5 further comprising:

prior to installing said first segment, attaching a journal at the end of said first segment and at the end of said last segment that will become an end of said roller; wherein said attaching step is done by welding said journal to said outer tubular roller member on both faces of said journal.

10. A method of making a rigid roller comprising:

(a) inserting at least one outer rigid tubular member on a rigid internal bridging connector so that said outer tubular members abut in adjacent alignment, said internal bridging connector being substantially shorter in length than the finished length of the roller;

(b) securing said outer tubular members to said internal bridging connector to prevent movement of said internal bridging connector relative to said outer tubular members;

(c) securing said outer tubular members to each other; and (d) after step (c), repeating steps (a) through (c) as needed to produce a roller of sufficient length, each repeating of steps (a)–(c) being performed with an additional rigid internal bridging member and an additional rigid tubular segment, wherein prior to commencing said repeating of steps (a)–(c), first inserting said additional rigid internal bridging connector onto one of said previously installed rigid tubular roller segments.

11. The method of claim 10 further comprising:

prior to inserting said first and second outer tubular members onto said internal connector, attaching a flange to the ends of said internal connector.

12. The method of claim 10 further comprising:

after step (d), welding a journal to both ends of said outer tubular roller member that will subsequently become the ends of said roller.

13. The method of claim 10 further comprising:

prior to inserting said outer tubular roller member onto said internal connector, welding a journal to both ends of said outer tubular roller member that will subsequently become the ends of said roller, said welding being done from each side of said journal.

14. The method of claim 10, wherein:

said securing of said outer tubular members to said internal connector is done by plug welding; and said securing of said outer tubular members to each other is done by fillet welding.

15. The method of claim 1 wherein the rigid internal connector is a solid across a cross-section thereof.

16. The method of claim 5 wherein the rigid internal connector is a solid across a cross-section thereof.

17. The method of claim 10 wherein the rigid internal connector is a solid across a cross-section thereof.

* * * * *

UNITED STATES PATENT AND TRADEMARK OFFICE
CERTIFICATE OF CORRECTION

PATENT NO. : 6,280,371 B1
DATED : August 28, 2001
INVENTOR(S) : Joseph Krippelz

It is certified that error appears in the above-identified patent and that said Letters Patent is hereby corrected as shown below:

<u>Title page,</u>
ABSTRACT, after "component" add a period.

<u>Column 5,</u>
Lines 3 and 4, delete "1 8a," and insert therefor -- 18a, --.

<u>Column 6,</u>
Line 20, delete "12d;" and insert therefor -- 12d, --.

<u>Column 7,</u>
Line 51, delete "30".

Signed and Sealed this

Twenty-third Day of April, 2002

*Attest:*

JAMES E. ROGAN
*Attesting Officer*   *Director of the United States Patent and Trademark Office*